United States Patent
Cheatham

[11] Patent Number: 6,019,562
[45] Date of Patent: Feb. 1, 2000

[54] BALE LOADING SYSTEM

[76] Inventor: Albert William Cheatham, Rte. 4 Box 391, Rusk, Tex. 75785

[21] Appl. No.: 08/955,381

[22] Filed: Oct. 21, 1997

[51] Int. Cl.[7] .................................................. B65G 57/32
[52] U.S. Cl. ...................... 414/111; 414/24.5; 414/789.7; 414/486; 414/502; 414/518; 414/555; 414/812; 414/813
[58] Field of Search ................................... 414/24.5, 111, 414/789.7, 518, 501, 502, 486, 555, 812, 813

[56]  References Cited

U.S. PATENT DOCUMENTS

| | | | |
|---|---|---|---|
| 3,811,584 | 5/1974 | Grey et al. | 414/789.7 |
| 3,952,881 | 4/1976 | Knudson | 414/789.7 |
| 4,259,035 | 3/1981 | DeCoene et al. | 414/789.7 |
| 4,363,583 | 12/1982 | Bontrager | 414/789.7 |
| 4,498,829 | 2/1985 | Spikes | 414/789.7 |
| 4,549,840 | 10/1985 | Ansbjer . | |
| 4,604,018 | 8/1986 | Kruse | 414/789.7 |
| 4,909,694 | 3/1990 | Peters et al. . | |
| 4,952,111 | 8/1990 | Callahan | 414/789.7 |
| 4,971,504 | 11/1990 | Klompien | 414/789.7 |
| 5,165,836 | 11/1992 | Shonka . | |
| 5,288,193 | 2/1994 | Warburton et al. . | |
| 5,316,426 | 5/1994 | Dwyer et al. . | |
| 5,333,981 | 8/1994 | Pronovost et al. . | |
| 5,405,229 | 4/1995 | Tilley | 414/111 |
| 5,647,716 | 7/1997 | Tilley | 414/789.7 |
| 5,690,461 | 11/1997 | Tilley | 414/789.7 |
| 5,730,572 | 3/1998 | Scheuren | 414/24.5 |

FOREIGN PATENT DOCUMENTS

| | | | |
|---|---|---|---|
| 55-114625 | 9/1980 | Japan | 414/789.7 |

*Primary Examiner*—Christopher P. Ellis
*Assistant Examiner*—Douglas Hess
*Attorney, Agent, or Firm*—David W. Quimby

[57]  ABSTRACT

A bale loading system comprising a bale carrier and a method for loading, transporting, and unloading large bales of agricultural material. The bales can be either round or rectangular bales. The bale carrier is towed to a bale in a field. The bale is positioned in a bale loading mechanism and securely clamped. The bale is lifted, rotated, and placed on the bale carrier such that a flat surface of the bale rests on the bale carrier. A plurality of bales can be loaded onto the bale carrier. After the bale carrier is loaded, the bale loader is transported to a bale storage location where the bales are unloaded. The bales are unloaded such that a bound surface of an unloaded bale faces skyward, and such that an unbound surface of a bale faces an unbound surface of a previously unloaded bale.

12 Claims, 4 Drawing Sheets

BALE LOADING SYSTEM

BACKGROUND OF THE INVENTION (1) Field of the Invention

This invention relates to agricultural equipment, and more particularly to a mechanism and method for handling large bales of agricultural material.

(2) Description of Related Art

It is a common practice to pack hay and other agricultural materials that are baled in large bales that weigh well over seven hundred pounds. A bale can have cylindrical or regular parallelepiped geometry. A cylindrical bale is referred to as a "round bale," and a regular parallelepiped bale is referred to as a "rectangular bale."

Agricultural workers work fields in a single direction so that rows formed in the soil are parallel to each other and run in one principal direction. It is desirable to operate equipment that works a field so that the equipment follows the rows of the field.

Balers generally discharge bales so that two substantially parallel flat surfaces of a discharged bale are aligned with the direction in which the field is worked. A baler discharges a bale when a full bale has been formed. Therefore, bales are randomly spaced throughout a field after a baler has been used. The flat surfaces of a bale that are aligned with the field rows generally have no binding on them. The other surfaces of the bale are bound by the baler to keep the bail together. For round bales, this means that the cylindrical axis of the bale is transverse to the direction in which the field is normally worked.

For bale loaders that lift a round bale by an arcuate surface of the bale, such as the bale loaders shown in U.S. Pat. No. 4,549,840 issued to Ansbjer or U.S. Pat. No. 5,165,836 issued to Shonka, the bale loader had to approach the bale in a direction perpendicular to the normal direction that the field is worked. This produced a very uncomfortable ride for the worker, damaged the field, and could cause damage to the equipment being operated. Also, this could be impracticable if the field had ditches or elevational changes through which the bale loader could not pass.

A prior art solution to the approach problem was to follow the rows of the field and rotate a bale by mechanical means before the bale was lifted onto a trailer as described in U.S. Pat. No. 4,909,694 issued to Peters et al., and in U.S. Pat. No. 5,288,193 issued to Warburton et al. Another prior art solution to the problem was to follow the rows of the field and then ram the bale with an extension of the bale loader to turn the bale as described in U.S. Pat. No. 5,316,426 issued to Dwyer et al. or as described in U.S. Pat. No. 5,333,981 issued to Pronovost et al.

After the bales are loaded, the bales are transported to a storage area and stored. When the bales are stored, it is desirable that the bales be positioned in a tight group to conserve space. Also, the unbound surfaces of the stored bales should face each other to minimize weather damage to the bales.

SUMMARY OF THE INVENTION (1) Progressive Contribution to the Art

I have invented a simple and efficient bale carrier for loading, transporting, and unloading bales of agricultural material. The bale carrier can be used to handle round or rectangular bales. The bale carrier comprises a trailer having a bale loading mechanism and a bale conveyor. The bale carrier is towed by a towing vehicle. The towing vehicle travels in a field in the direction in which the field is normally worked.

The bale loading mechanism loads a bale onto the trailer so that a flat surface of the bale is on the trailer. More bales are loaded on the trailer until the trailer is full. After the bale carrier has been loaded with bales, the bale carrier is towed to a storage area where the bales are unloaded. The bale carrier unloads a bale so that a bound surface of the bale is on the ground and a bound surface faces skyward. When multiple bales are unloaded, the bale loader unloads the bales in a tight group such that an unbound surface of an unloaded bale faces an unbound surface of another unloaded bale.

(2) Objects of this Invention

An object of this invention is to provide a bale carrier which loads, transports, and unloads bales of agricultural material.

Another object is to provide a method for loading, transporting and unloading bales.

Another object is to provide a bale carrier that can handle either round or rectangular bales.

Another object is to provide a bale carrier which travels in a field in a direction in which the field is normally worked.

Another object is to provide a bale carrier which loads a bale onto the bale carrier so that a flat surface of the bale lies on the bed of the carrier.

Another object is to provide a bale carrier which performs a minimum of bale manipulations when loading a bale onto the bale carrier.

Another object is to provide a bale carrier which unloads loaded bales in a tight group in a desired location.

Another object is to provide a bale carrier which unloads loaded bales so that an unbound surface of an unloaded bale faces an unbound surface of another unloaded bale, thus helping to minimize weather damage to the bales.

Another object is to provide a bale carrier which unloads bales so that a bound surface of each unloaded bale faces skyward, thus helping to minimize weather damage to the bales.

Further objects are to achieve the above with a device which is sturdy, durable, simple, safe, efficient, versatile, ecologically compatible, energy conserving and reliable; yet is inexpensive and easy to manufacture, install, maintain and use.

Other objects are to achieve the above with a method that is rapid, versatile, ecologically compatible, energy conserving, efficient, inexpensive, and does not require highly skilled people to install, maintain or use.

The specific nature of the invention, as well as other objects, uses, and advantages thereof, will clearly appear from the following description and from the accompanying drawings, the different views of which are not necessarily scale drawings.

Figure 1:
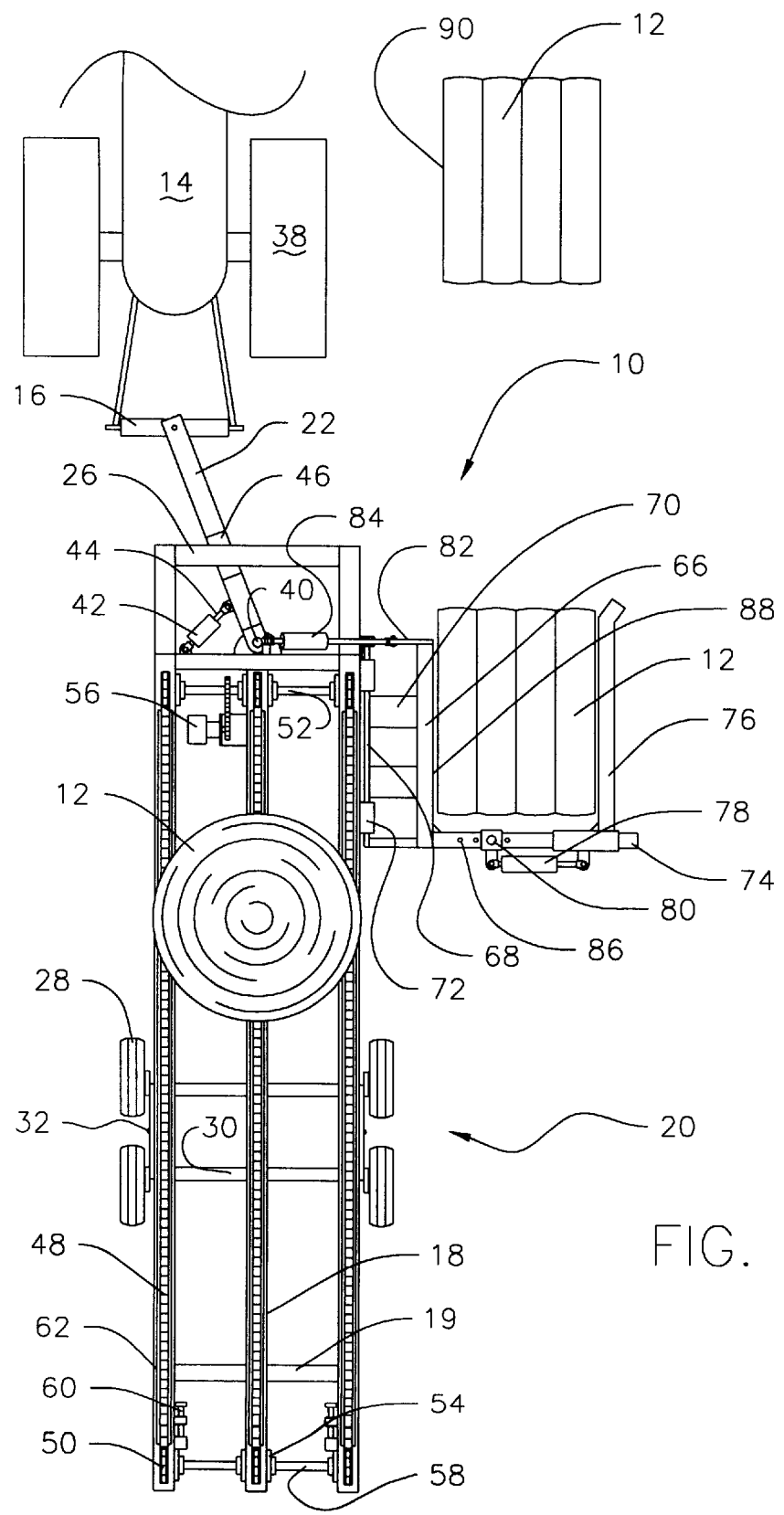
FIG. 1 is a top elevational view of a bale carrier connected to a tractor, said tractor having a power lift.

As an aid to correlating the terms of the claims to the exemplary drawings the following catalogue of elements is provided:

| | | | |
|---|---|---|---|
| 10 | bale carrier | 52 | drive shaft |
| 12 | bale | 54 | bearing |
| 14 | towing vehicle | 56 | motor |
| 16 | power lift | 58 | idler shaft |
| 18 | frame member | 60 | set screw |
| 19 | cross support | 62 | chain guide |
| 20 | wheel base | 64 | chain teeth |
| 22 | adjustable tongue | 66 | first gripping arm |
| 24 | towing support member | 68 | pivot shaft |
| 26 | tongue support member | 70 | bale loader support |
| 28 | trailer wheel | 72 | shaft mount |
| 30 | axle | 74 | arm |
| 32 | pivot | 76 | second gripping arm |
| 34 | pivot mount | 78 | clamping cylinder |
| 36 | ground | 80 | pin |
| 38 | wheel | 82 | lift arm |
| 40 | tongue attachment pivot | 84 | lift cylinder |
| 42 | tongue adjustment cylinder | 86 | hole |
| 44 | tongue adjustment arm | 88 | inside clamp surface |
| 46 | wearpad | 90 | flat bale surface |
| 48 | bale transport chain | 100 | double wide bale carrier |
| 50 | sprocket | | |

DETAILED DESCRIPTION

With reference to the drawings, a bale carrier is designated generally as 10. The bale carrier is used to load, transport, and unload large bales 12 of agricultural material. The bale carrier comprises a trailer, a bale conveyor, and a bale loader. The bale carrier 10 is towed by towing vehicle 14. The towing vehicle 14 has means for raising or lowering front end of the trailer. The preferred towing vehicle 14 is a tractor, and power lift 16 of the tractor is used to raise or lower the front end of the bale carrier 10.

The trailer comprises longitudinal frame members 18, cross supports 19, wheel base 20, adjustable tongue 22, towing support members 24, and tongue support members 26. The upper surfaces of the longitudinal frame members 18 form a trailer bed upon which a bale 12 is placed.

Figure 2:
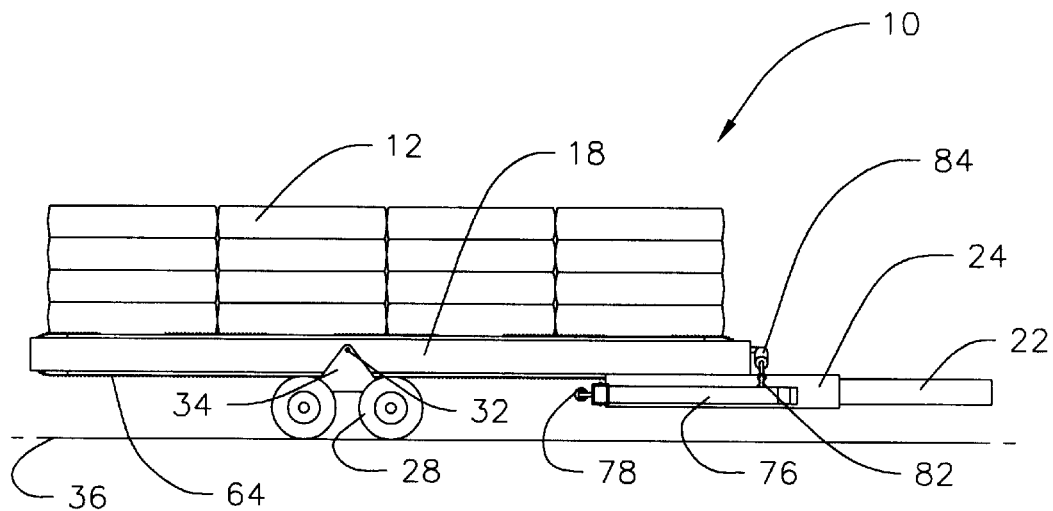
FIG. 2 is a side elevational view of a horizontally positioned, loaded bale carrier.
Figure 3:
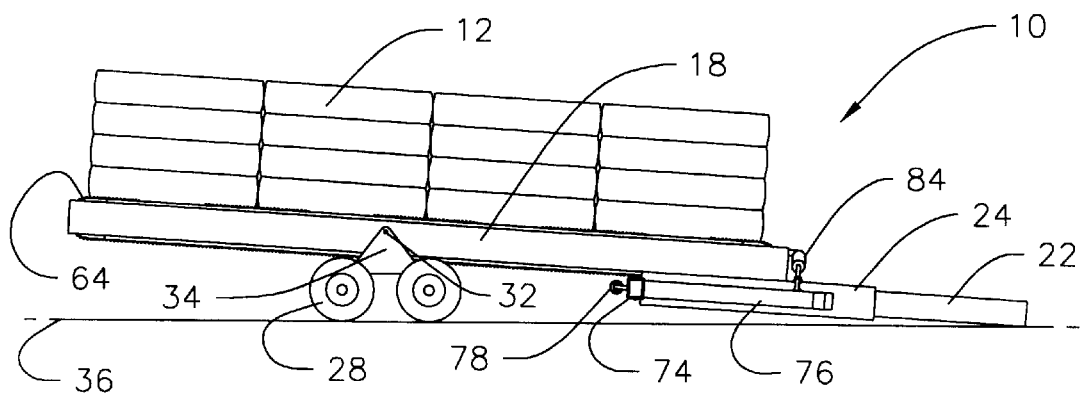
FIG. 3 is a side elevational view of an inclined, loaded bale carrier.

The wheel base 20 includes wheels 28, axles 30, pivot 32, and pivotal mount 34. The wheel base 20 is pivotally attached to the longitudinal frame members 18, as shown in FIGS. 2 and 3. Because of this pivotal attachment, when the front end of the trailer is raised, the rear end of the trailer is lowered; and vice versa. This allows height adjustment of the front end and the rear end of the bale carrier 10 relative to ground 36.

The adjustable tongue 22 allows the bale carrier 10 to be pulled parallel but offset from the path of travel of the towing vehicle 14. An offset distance is needed so that a bale 12 can be easily positioned in the bale loader of the bale carrier 10 without interference from wheel 38 of the towing vehicle 14. The adjustable tongue 22 is attachable to the power lift 16 of the towing vehicle 14. The adjustable tongue 22 is connected to the bale carrier 10 at tongue attachment pivot 40. Tongue adjustment cylinder 42 is pivotally connected to the adjustable tongue 22 and to the bale carrier 10. The offset distance of the bale carrier 10 from the towing vehicle 14 is controlled by adjusting the length of tongue adjustment arm 44 of the tongue adjustment cylinder 42. When the tongue adjustment arm 44 is fully extended, the bale carrier 10 is pulled directly behind the towing vehicle 14, and there is no offset distance.

The towing support members 24 provide additional structural strength to the bale carrier 10. Also, the bale loader is mounted on a towing support member 24.

The tongue support members 26 help to prevent wear at the tongue attachment pivot 40 when the front end of the bale carrier 10 is raised or lowered. Wear pads 46 can be mounted on the top and bottom surfaces of the adjustable tongue 22 to prevent metal to metal contact between the adjustable tongue and the tongue support members 26. When a wear pad 46 is abraded away, it can be replaced. The wear pads 46 should be made of a polymer, preferably Nylon.

The bale conveyor comprises bale transport chains 48, sprockets 50, drive shaft 52, bearings 54, bale conveyor motor 56, idler shaft 58, set screws 60, chain guides 62 and chain teeth 64. Each longitudinal frame member 18 supports a bale transport chain 48. The bale transport chains 48 are mounted on the sprockets 50. At the front end of the trailer, the sprockets 50 are attached to the drive shaft 52. The drive shaft 52 is attached to the trailer by bearings 54. The drive shaft 52 is driven by the bale conveyor motor 56. The sprockets 50 at the rear end of the trailer are attached to the adjustable idler shaft 58. The idler shaft 58 is attached to the trailer by bearings 54. Adjusting the set screws 60 changes the position of the adjustable idler shaft 58, which allows for tension adjustment of the bale transport chains 48.

Chain guides 62 are located along the length of the longitudinal frame members 18 to prevent the chains 48 from wearing against the longitudinal frame members. The chain guides 62 should be made of a polymer, preferably Nylon. When a chain guide 62 is worn away by a chain 48, the chain guide can be removed and replaced.

The bale transport chains 48 have teeth 64. The teeth sink into a bale 12 when the bale is loaded onto the bale carrier 10. This allows the bale 12 to be transported along the length of the trailer bed by the bale transport chains 48.

Figure 4:
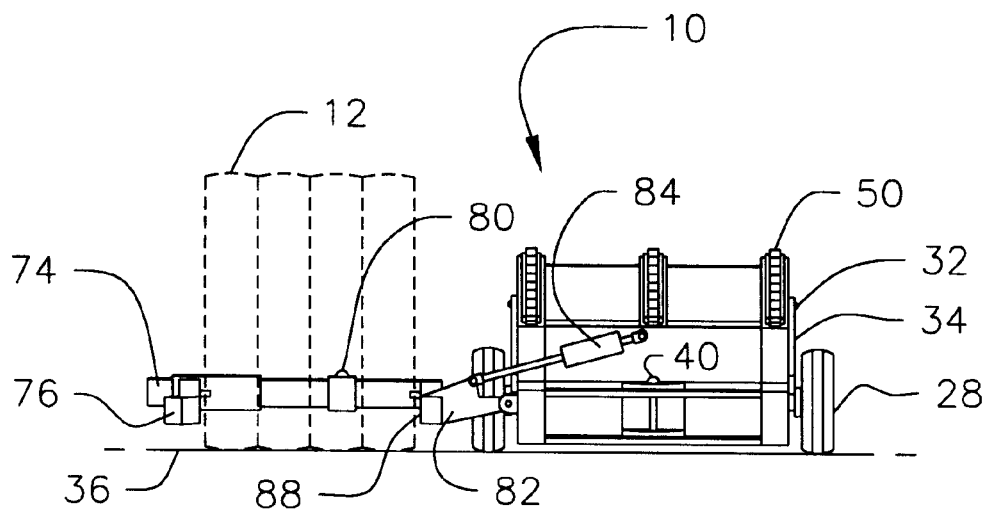
FIG. 4 is a front elevational view of an inclined bale carrier with the bale loader in an initial position; for clarity, the adjustable tongue is not shown.
Figure 5:
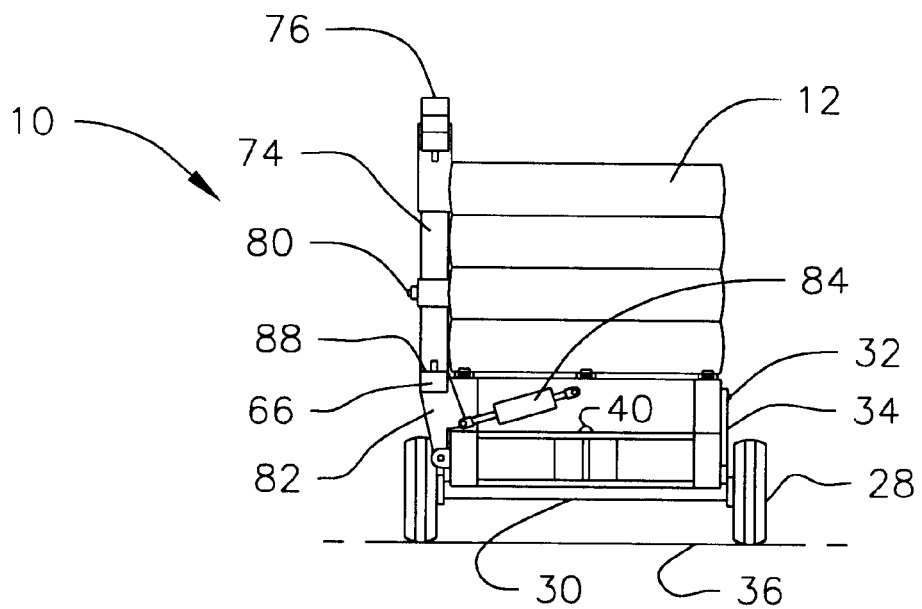
FIG. 5 is a front elevational view of a horizontally positioned bale carrier with the loader in a lifted position; for clarity, the adjustable tongue is not shown.

As shown in FIGS. 1, 4, and 5, the bale carrier 10 includes the bale loader. The bale loader comprises first gripping arm 66, pivot shaft 68, bale loader supports 70, shaft mounts 72, arm 74, second gripping arm 76, clamping cylinder 78, pin 80, lift arm 82, and lift cylinder 84. The first gripping arm 66 is connected to the pivot shaft 68 by bale loader supports 70. The pivot shaft 68 is pivotally connected to the trailer at shaft mounts 72. The pivotal connection allows the bale loader to rotate and lift a bale 12 relative to the trailer.

The first gripping arm 66 is connected to the arm 74. The second gripping arm 76 slides onto arm 74. The clamping cylinder 78 connects the second arm 76 to the arm 74. The clamping cylinder 78 is adjustably mounted to the arm by pin 80. The pin 80 is positioned through holes 86 in the arm 74. Adjustment of the position of the clamping cylinder 78 allows the bale carrier 10 to handle different bale sizes. When the clamping cylinder 78 is engaged, a bale 12 positioned between the first gripping arm 66 and the second gripping arm 76 is securely clamped.

The lift arm 82 is connected to the first gripping arm 66. The lift cylinder 84 is pivotally connected to the lift arm 82 and to the trailer. When the lift cylinder 84 is engaged, the bale loader rotates approximately 90° into the bale loader's lifted position, as shown in FIG. 5. When the bale loader is in the lifted position, inside clamp surface 88 of the first gripping arm 66 is located above the teeth 64 of the bale transport chains 48.

The bale carrier 10 has clamping cylinder 78, lift cylinder 84, and tongue adjustment cylinder 42, as described above. Also, the bale carrier has bale conveyor motor 56, as described above. The various controls and power requirements (not shown) for operating these units are delivered from the towing vehicle 14 through power takeoff means or through the utilization of hydraulic pump means driven through towing vehicle mechanisms. Because this arrangement is well known in the art, no further discussion is provided about such equipment.

A baler (not shown) generally discharges bales 12 so that two substantially parallel flat surfaces 90 of a bale are aligned with the direction in which a field is normally worked. These flat surfaces 90 generally have no binding on them. The other surfaces of the bale 12 are bound with binding by the baler to keep the bail together. In general, a bale 12 has either cylindrical or regular parallelepiped geometry. A bale with cylindrical geometry is referred to as a round bale, and a bale with regular parallelepiped geometry is referred to as a rectangular bale. Bales are formed in many different sizes. For example, a round bale can have a diameter that ranges from 4 feet to 6 feet. Usually, all bales in a field are of the same general size, and the bales are randomly spaced throughout the field.

To use the bale carrier 10 to load bales 12, the bale carrier is attached to the towing vehicle 14. The tongue adjustment cylinder 42 is set so that the clamp surface 88 of the first gripping arm 66 is located beyond wheel 38 of the towing vehicle 14 when the bail carrier 10 is towed, as shown in FIG. 1. The front end of the bail carrier 10 is lowered by the power lift 16 so that the lowest points of the first gripping arm 66 and the second gripping arm 76 are about six inches above the ground 36 as shown in FIGS. 3 and 4.

The bail carrier 10 is towed to a bale 12 in a field, and the bale is positioned between the first arm 66 and the second arm 76 of the bale loader. Then, the clamping cylinder 78 is engaged to securely clamp the flat surfaces 90 of the bale between the first gripping arm 66 and the second gripping arm 76. Next, the lift cylinder 84 is engaged to lift and rotate the bale above the trailer bed. The clamping cylinder is disengaged and the bale falls on the trailer bed so that a flat surface 90 of the bale lies on the trailer bed, and on the teeth 64 of the bale transport chains 48. The lift cylinder 84 is disengaged so that the bale loader rotates back to the bale loader's initial position as shown in FIG. 4.

The bale conveyor motor 56 is engaged to move the loaded bale 12 towards the rear end of the bail carrier 10 so that another bale can be loaded onto the bail carrier. When the bale 12 is beyond the rearmost surface of the bale loader, sufficient room exists for another bale to be loaded on the trailer, and the motor 56 is turned off. Then, the bail carrier 10 is towed to another bale 12 in the field, and the bale is loaded onto the trailer as described above.

After the bale carrier 10 has been fully loaded, the front end of the bale carrier 10 is raised by the power lift 16 so that the trailer bed is generally parallel to the ground 36. Also, the tongue adjustment cylinder 42 is engaged to fully extend the tongue adjustment arm 44 so that the trailer is towed directly behind the towing vehicle 14. The bail carrier 10 is towed to a bale storage area. The bail carrier 10 is positioned in front of the area where the first bale 12 is to be unloaded. Then, the rear end of the bail carrier 10 is lowered or raised by raising or lowering the power lift 16 of the tractor. The distance between the rear end of the trailer and the ground 36 is adjusted so that a bale that falls off the rear end of the trailer will rotate as it falls and land so that a bound surface of the bale faces skyward.

To unload a bale 12 from the bail carrier 10, the bale conveyor motor 56 is turned on. The bale 12 that is being unloaded will travel towards the rear end of the bail carrier 10 until the center of gravity of the bale is beyond the rear end of the bail carrier. When the center of gravity of the bale 12 is beyond the bail carrier 10, the bale will fall off the trailer bed 38 and land on the ground such that a bound surface of the bale faces skyward. Then, the bale conveying motor 56 is turned off.

To unload another bale 12, the bale carrier 10 is moved forward by the towing vehicle 14 a sufficient distance to allow the next bale being unloaded to fall next to the previously unloaded bale. Then the bale conveying motor 56 is turned on. The bale being unloaded is conveyed off the rear end of the bail carrier 10, and the bale conveying motor 56 is turned off. The above steps are repeated until the bale carrier 10 is completely unloaded. After the bail carrier 10 has been unloaded, the front end of the bail carrier 10 is adjusted with the power lift 16 so that the trailer bed is generally parallel to the ground 36.

Figure 6:
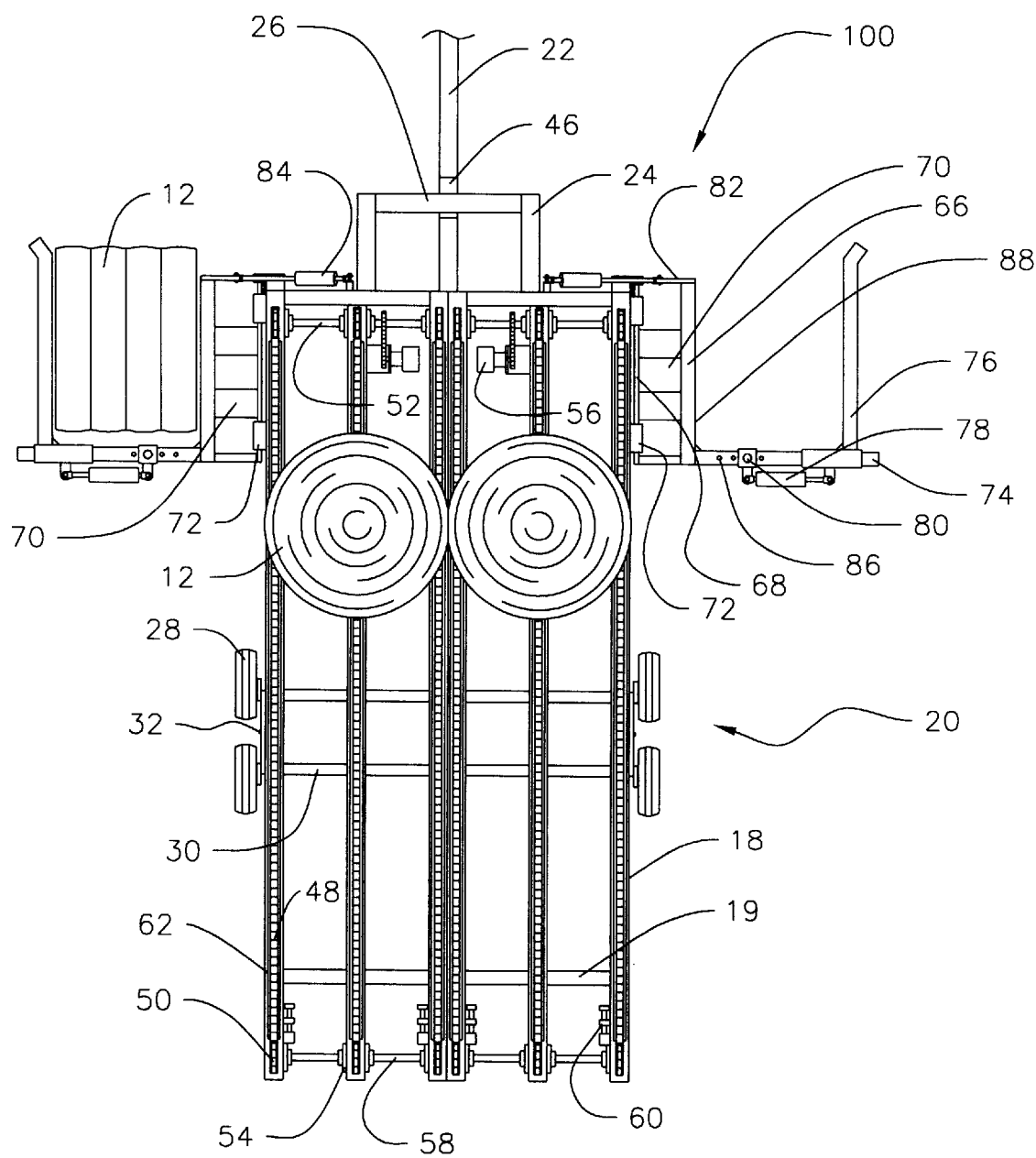
FIG. 6 is a top elevational view of a double wide trailer having a bale loader on side of the trailer.

In an alternate embodiment as shown in FIG. 6, the bail carrier 100 is double wide and has two separate bale loaders and two separate bale conveyors. Also, the clamp surface 88 of each bale loader will extend beyond the wheels 38 of the towing vehicle. Such a bale carrier would not need an adjustable tongue, and such a bale carrier would have double the bale capacity of the bale carrier as previously described.

The embodiments shown and described above are only exemplary. I do not claim to have invented all the parts, elements, or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A bale carrier for loading, transporting, and unloading round or rectangular bales, said bales having two substantially flat parallel surfaces, comprising:

a bale trailer having a front end, a rear end, sides, and a bed;

drive means attached to the front end of the bale trailer for moving the bale trailer;

a bale conveyor mounted on the bale trailer for moving a loaded bale towards the rear end of the bale trailer; and a bale loader attached parallel to a bale trailer side, said bale loader having an axis of rotation which is parallel to the bale trailer side, wherein said bale loader grips a bale, rotates and lifts the bale above and over the bale trailer side, and releases the bale so that a flat surface of the bale is positioned on the bale trailer bed.

2. The bale carrier as defined in claim 1 wherein the drive means further comprises:

elevation means for raising or lowering the front end of the bale trailer.

3. The bale carrier as defined in claim 2 further comprising a wheel base pivotally mounted to the bale trailer so that when the front end of the bale carrier is raised, the rear end of the bale trailer is lowered.

4. The bale carrier as defined in claim 2 wherein the drive means is a tractor, and the elevation means is a power lift.

5. The bale carrier as defined in claim 1 wherein the bale loader comprises:

a first arm pivotally connected to the bale trailer side;

a gripping arm connected to the first arm;

second arm connected to the gripping arm;

gripping means located on the gripping arm for releasably clamping two flat substantially parallel surfaces of a bale between the first arm and the second arm; and lifting means connecting the bale trailer to the bale loader for rotating and lifting a bale clamped between the first arm and the second arm above and over the bale trailer side.

6. The bale carrier as defined in claim 1 wherein the bale conveyor comprises:

a motor;

a shaft connected in working relation to the motor and to the bale trailer;

a plurality of sprockets connected to the shaft;

a plurality of conveyor chains attached to the sprockets;

a plurality of bale gripping teeth attached to the chains; and an idler shaft with a plurality of sprockets connected in working relation to the conveyor chains and to the bale trailer.

7. The bale carrier as defined in claim 1 further comprising means for pulling the bale trailer behind and offset from the drive means so that the bale loader extends beyond a wheel of the drive means.

8. A method of loading round or rectangular bales onto a wheeled bale carrier, said bale carrier having a bale loader, a bale conveyor, a front end, a rear end, and sides, said sides perpendicular to wheel axles of the bale carrier, comprising:

moving the bale carrier to a bale, said bale having two flat substantially parallel surfaces;

positioning the bale within the bale loader, said bale loader operably connected to the bale carrier so that the bale loader has an axis of rotation which is parallel to the sides of the bale carrier;

engaging the bale loader to rotate and lift the bale above and over a side of the bale carrier;

releasing the bale to place a flat surface of the bale on the bale carrier; and returning the bale loader to an initial position.

9. The method of loading bales as defined in claim 8 further comprising:

engaging the bale conveyor to move a loaded bale towards the rear end of the bale carrier;

stopping the bale conveyor when the bale has moved a distance sufficient to allow another bale to be loaded on the bale carrier;

moving the bale carrier to a bale;

positioning the bale within the bale loader;

engaging the bale loader to rotate and lift the bale above and over a side of the bale carrier;

releasing the bale to place a flat surface of the bale on the bale carrier; and returning the bale loader to the initial position.

10. The method of loading bales as defined in claim 8 wherein positioning the bale within the bale loader further comprises clamping the bale across the flat surfaces of the bale.

11. The method of loading bales as defined in claim 8 further comprising:

moving the bale carrier to a bale storage area;

engaging the bale conveyor to convey a bale towards the rear end of the bale carrier;

conveying the bale off the rear end of the carrier; and stopping the bale conveyor.

12. The method of loading bales as defined in claim 11 further comprising:

moving the bale carrier forward a sufficient distance to allow another bale to be unloaded; and engaging the bale conveyor to convey a bale towards the rear end of the bale carrier;

conveying the bale off the rear end of the bale carrier; and stopping the bale conveyor.

\* \* \* \* \*